June 24, 1930.  F. A. HART  1,767,792
COMBINED TYPEWRITING AND COMPUTING MACHINE
Original Filed Feb. 18, 1926
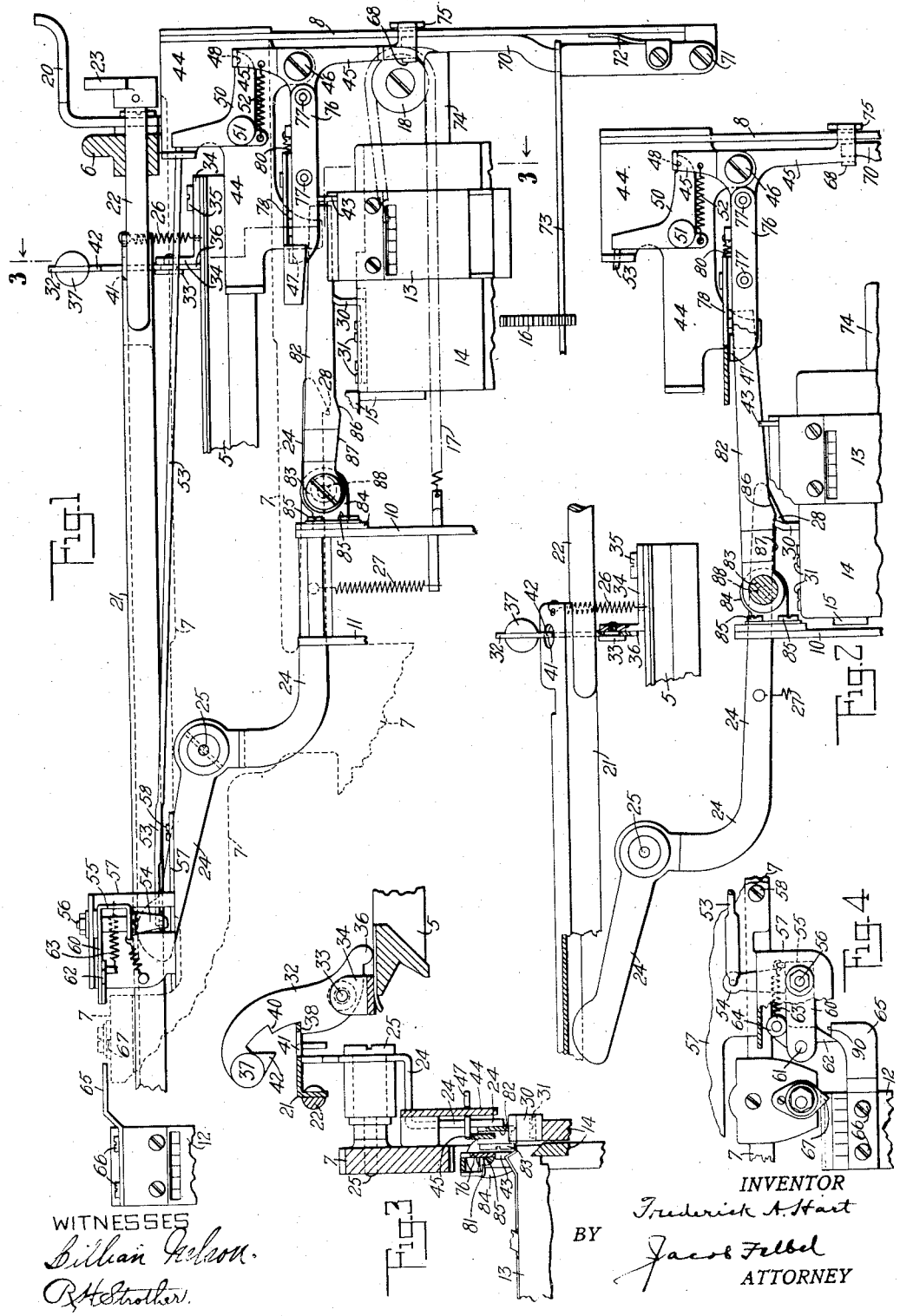
INVENTOR
Frederick A. Hart
BY Jacob Felbel
ATTORNEY
WITNESSES Patented June 24, 1930

1,767,792

UNITED STATES PATENT OFFICE

FREDERICK A. HART, OF NEW BRITAIN, CONNECTICUT, ASSIGNOR TO REMINGTON ACCOUNTING MACHINE CORPORATION, OF NEW YORK, N. Y., A CORPORATION OF NEW YORK

COMBINED TYPEWRITING AND COMPUTING MACHINE

Application filed February 18, 1926, Serial No. 89,134. Renewed April 12, 1930.

My invention relates to combined typewriting and computing machines, and it consists in certain features of construction and combinations and arrangements of parts all of which will be fully set forth herein and particularly pointed out in the claims.

My invention is shown applied to what is known commercially as the No. 23 Remington bookkeeping machine, but it is not limited in its application to that machine. In that machine, as in some others, there is provided cross-footing mechanism including a jumping element, which element in the Remington machine is the cross totalizer and a small carriage on which it is mounted. This carriage is picked up by each of the vertical totalizers which travel with the typewriter carriage, and at the end of each computing column it snaps back under the influence of a spring to its normal position to be picked up again at the next computing column. In the Remington machine as heretofore constructed a latch has been provided and so arranged that the operator could push the cross carriage or truck to its extreme operated position or a little beyond that and latch it there, thus putting this carriage entirely out of operation and leaving the operator free to use the machine in other ways with or without adding numbers in the vertical totalizer and without in any wise affecting the cross truck and cross totalizer. The latch heretofore used for this purpose has had certain disadvantages which it is one of the objects of the present invention to obviate by providing a different means for holding the cross truck in its extreme inoperative position.

The Remington bookkeeping machine is also provided with clearance proof mechanism for the cross totalizer, which mechanism includes a certain locking lever that is normally held up in an inoperative position but is automatically tripped off at a predetermined point in the carriage travel in order at that point to test the cross totalizer for clearance. When heretofore the cross truck has been latched in its inoperative position this clearance proof locking lever has nevertheless been tripped off at the predetermined point in each leftward travel of the typewriter carriage and it has been necessary for the operator to restore said locking lever by hand each time it was tripped off. This was disadvantageous for two reasons—first, because it was an unnecessary operation consuming some of the time and abstracting some of the attention of the operator; and, second, because if it had to be done frequently it was likely to get the operator into the bad habit of continually restoring this locking lever at times when the operation of said lever had no significance. This led to the danger that when the cross footer was in use and the locking lever was properly dropped to locking position so as to warn the operator that the totalizer was not clear she would absent-mindedly restore it without attaching the proper significance to it due to the habit she had formed when not using the cross totalizer.

My invention has for a second object to provide means whereby when the cross truck is placed in its inoperative position the act of doing so also disables the clearance proof mechanism so that during the time when the machine is being used for purposes that do not require the use of a cross totalizer the clearance proof mechanism is incapable of locking up the machine.

One instance of my invention is illustrated in the accompanying drawings, all of which are more or less fragmentary in character, showing only so much of the machine as is necessary to an understanding of my invention.

Figure 1 is a front view partly in section and partly broken away, the mechanism being in normal position.

Figure 2 is similar to a portion of Fig. 1 but shows the cross footer locked in its inoperative position and the clearance proof mechanism disabled.

Figure 3 is a front to rear vertical section on the line 3—3 of Fig. 1 and looking in the direction of the arrows at said line.

Figure 4 is a plan view of a portion of the mechanism.

The No. 23 Remington bookkeeping machine includes a Remington No. 12 typewriter of which a fragment of the carriage is shown at 5. A cross section of one of the arms which project forward from the typewriter carriage and to which the main or vertical truck (not shown) of the computing mechanism is attached, is shown at 6 in Fig. 1.

The framework of the computing mechanism includes a main casting 7 which is supported on the top plate of the typewriter and a portion of which is shown in Fig. 1 in dotted lines in order to avoid hiding the mechanism; and said framework also includes various plates, as 8, 10 and 11, projecting forward from said casting. The machine is usually equipped with several vertical totalizers 12, of which only one is shown, and with a cross totalizer 13, which latter is mounted on the cross truck or carriage 14 which is capable of a short travel right and left. Said truck has a bracket 15 to which is pivoted the pick-up beam or hook which intermittently couples it to one after another of the vertical totalizers 12, each of which draws the cross totalizer step by step across the cross master wheel 16. When the cross truck is released from the vertical totalizer it is drawn back to the right by a long coiled spring 17 which runs over a pulley 18 mounted on the frame plate 8.

The typewriter carriage is equipped at each end thereof with a carriage release key 20 which is pivoted to the arm 6. In some classes of work the operator will move the carriage a considerable distance to the left by the use of this key, passing over several adding columns. In order to prevent the cross truck from jumping back and forth in that operation means are provided to hold the cross truck in its extreme left position when the carriage is moved rapidly leftward by the use of the key 20, said means being fully shown and described in my prior Patent No. 1,517,424, Dec. 2, 1924. Said means includes a sheet metal bar or flap 21 folded longitudinally into an angle or channel-bar shape and having fastened thereto at each end a round bearing rod 22, which is pivoted in the bracket 6 and which has an arm 23 mounted on its outer ends beneath the key 20 so that when said key is depressed the bar 21 is rocked so as to raise its rear edge. A lever 24 has its hub mounted on a pivot screw 25 screwed into the rear side of the casting 7 and its leftward extending arm is rounded and rests against the under side of the flap 21, the weight of which, assisted by a spring 26, holds the left end of the lever 24 down. Said lever has a rightward extending arm which is pulled downward by a spring 27 which however is unable to overcome the spring 26. The extreme end of this arm is formed into a hook 28 which is adapted to snap over a bracket 30 which is secured by screws 31 to the cross truck 14. The long flap 21 normally holds the hook 28 up out of the path of the bracket 30 but when on depression of the key 20 said flap is rocked upward said hook descends far enough so that it can catch over the bracket 30 and lock the cross truck in its left-hand position. The bracket 30 is adjustable right and left and it is so adjusted that in the ordinary step by step travel of the carriage leftward said bracket will not quite reach the position where the hook 28 could catch it even if said hook were in its depressed position, but when the carriage is moved at all rapidly leftward as by the use of the release key 20 the cross truck overthrows slightly and the hook 28 catches it in such a position that the pick-up beam which is pivoted to the bracket 15 is not affected by the passing vertical totalizers. I employ this hook 28 which has just been described as the means for locking the cross truck in its inoperative position, this being rendered possible by an added device which will now be described.

A detent 32 is pivoted at 33 to a supporting bracket 34 which is secured by screws 35 to the typewriter carriage 5. The detent 32 is in the nature of a lever having a heel 36 in position to limit the backward motion of the upper arm of said detent, which upper arm extends upward and forward from the pivot and is preferably provided with a globular part 37 which serves the double purpose of a handle and a weight. Said detent is made with a lower shoulder 38 on which the flap 21 normally rests and with an upper shoulder 40 adapted to hold the flap up as shown in Fig. 2 in case said flap is lifted by hand. This shoulder 40 is however a little too high to catch the flap and retain it when said flap is raised by the release key 20. It will be seen that by simply raising the flap and allowing it to be caught on the shoulder 40 the hook 24, 28 will be allowed to drop down as shown in Fig. 2 whereupon the cross truck may be pushed to its left-hand position by hand, and it will be held there until the operator by touching the detent 32 releases the flap and thereby releases the hook 28.

In order to insure that the detent 32 shall take hold of the flap every time the latter is raised by hand, said flap is made with a hole 41 and the overhanging end of the detent is made with a V-shaped beak 42. The construction is such that if the bar or flap 21 be pulled up briskly by the finger the rear wall of the hole 41 will strike the rearwardly inclined side or edge of the beak 42 and by cam action positively draw the detent 32 forward to a position where the shoulder 40 is underneath the edge of the flap so that when the operator lets go of the latter it will with certainty drop back on to said shoulder.

The clearance proof mechanism employed in the Remington bookkeeping machine and shown in the drawings is substantially that shown and described in the patent to A. F. Poole for Calculating machine, No. 1,491,-167, Apr. 22, 1924, the same being an improvement on the clearance proof mechanism shown in the patent to Poole 1,483,679, Feb. 12, 1924. Said mechanism includes a finger 43 which projects upward from the cross totalizer and has a slight front and rear motion. When the cross totalizer is clear the finger may occupy its rear position shown in Fig. 3, but when not clear it is constrained to occupy a position forward of that shown. The mechanism co-operating with said finger is mounted on a bracket plate 44 secured to the right-hand end of the casting 7. A three-armed locking lever 45 is pivoted to said bracket at 46, said lever including a leftward extending arm from which an ear 47, Fig. 3, is bent off rearwardly and notched to embrace for guiding purposes a depending portion of the bracket 44. The lever 45 has an upwardly extending arm from which an ear 48 is bent off rearwardly, said ear normally lying in a notch in the end of a latch lever 50 which is pivoted at 51 to the plate 44. A spring 52 connecting said latch lever and the lever 45 holds the former in latching position and tends to rock the latter counter-clockwise, which motion is resisted by the latch lever. Said latch lever has an upwardly extending arm by which it is on occasion tripped to allow the lever 45 to rock to its locking position, this tripping being done by a long push rod 53, which at its left-hand end is pivoted to the arm 54 of a bell crank comprising a yoke-piece 55 which is pivoted on a stud or bolt 56 which hangs down from the horizontal shelf-like portion of a sheet metal bracket 57 which by screws 58 is secured to the casting 7. Said bell crank has a leftward extending arm 60 to which at 61 there is pivoted a dog 62 which is acted on by a spring 63, the motion of said dog by said spring being limited by a lug 64 on said dog engaging the rear edge of the arm 60. Said dog projects forward from said arm, its right-hand edge being inclined as shown in Fig. 4 for cooperation with a tripper 65 secured by screws 66 to the top of one of the vertical totalizers 12. The position of said vertical totalizers relative to the vertical master wheel is indicated by a pointer 67 cooperating with scale marks on the totalizer. In Fig. 4 this totalizer is shown standing in the position of lowest order and the tripper 65 is in engagement with the dog 62. When the last digit of a number is written the carriage and with it the totalizer 13 will make one step to the left upon which the tripper 65 will rock the bell crank 60, 54 and operate the push rod 53 which will trip off the latch 50 and allow the locking lever 45 to rock counter-clockwise to its locking position. Said lever 45 has a depending arm from which a lug 68 is bent off so as to engage a lever 70 which is pivoted at 71 to the frame plate 8 and is urged leftward by a spring 72. This lever is connected by a link 73 with certain locking mechanism in the machine whereby the numeral keys are locked whenever the carriage stands in a computing column and at the same time the lever 70 is in its right-hand position shown in Fig. 1. In said figure this lever is shown held in its locking position not by the locking lever 45 but by the cross truck 14 which is provided with a stop bar 74 which always holds the lever 70 in its right-hand position whenever the cross truck is in its retracted position. The depending arm of the lever 45 is also provided with a button or key 75 by tapping which the locking lever 45 can be manually restored to its normal unlocking position.

The left-hand arm of the lever 45 has a bar 76 secured thereto and spaced forward therefrom by posts 77 and this bar is so located that when the cross truck is in its right-hand position and the cross totalizer is clear the finger 43 stands beneath and supports said bar, as shown in Fig. 3. When the cross truck steps leftward said finger moves out from under the end of said bar, which end is rounded as shown in Fig. 1, so that when the locking lever has been dropped to its locking position, and the cross totalizer has then been released from its vertical totalizer, the finger 43 on the jump back of the cross truck striking this inclined end of the bar 76 will cam said bar upward to its unlocking position, provided the cross totalizer is clear at the time.

A lever 78 is pivoted to a bent off ear of the bar 76 so as to swing in a horizontal plane, its motion being influenced by a spring 80. This lever at its left-hand end is formed first downward and thence rearward, the rearwardly extending part of it being provided with inclines as shown in Fig. 3 at 81, these acting when the cross footer jumps back with a tendency to draw the finger 43 rearward under the bar 76 in case the locking lever has been dropped down to its locking position. The function of this cam lever 78 is fully explained in Patent 1,491,167, above referred to.

It will be perceived that even though the cross truck be latched in its left-hand position, as shown in Fig. 2, the locking lever 45 would be tripped off every time the tripper 65 passed the dog 62 in letter feed direction, unless means be provided to prevent it. The parts have been so tripped off in the machine as heretofore constructed, but by the present invention I have provided means to hold the locking lever in its normal inoperative position whenever the cross truck is latched at its left-hand position, as shown in Fig. 2. To this end a pivoted bar or lever 82 is pivoted on a headed and shouldered rivet 83 which rivet passes through a small bracket 84 secured by screws 85 to the frame plate 10. The lever 82 extends rightward from its pivot and rests on some suitable part of the cross truck 14, the bracket 30 being utilized in the present instance. At its right-hand end this lever stands as shown in Fig. 3 just back of the horizontal arm of the lever 45 and under the ear 47 that is bent rearward from said lever 45, so that if the lever 82 be swung upward it will strike said ear 47 and raise said lever 45 to or beyond its normal unlocking position. The lower edge of the lever 82 which rests on the bracket 30 is so shaped that during the greater part of the travel of the cross truck said lever 82 will be held about in the position shown in Figs. 1 and 3; but, about even with the hook 28, the edge of said lever is made with a downward incline 86 followed by a parallel part 87. The construction is such that when the cross truck approaches its extreme left-hand position the bracket 30 engaging the incline 86 raises the lever 82 as shown in Fig. 2, thus moving the locking lever 45 to or a little beyond its normal position and holding it there as long as the cross truck is in its extreme left-hand position. It will be perceived that this entirely disables the clearance-proof mechanism because the locking lever cannot drop down even though it be tripped off by the tripper 65.

In order to regulate the up-and-down position of the lever 82 its pivot is made capable of adjustment. To this end said pivot consists of a shouldered and headed rivet having a comparatively small part indicated by the small circle 88 which passes through the bracket 84 and preferably through a friction washer where it is riveted up; but the shouldered part of the rivet on which the lever 82 is pivoted is made eccentric to said small part and the head of the rivet is made with a screw-driver slot so that said rivet can be turned but it is riveted up tight enough so that it will remain in whatever position it is turned to. By turning this rivet while the parts stand in the position shown in Fig. 2 the pivotal end of the lever 82 can be moved slightly up or down, the lever at that time taking a fulcrum on the bracket 30 and the free end of the lever being thus adjusted to the right height.

As heretofore constructed the tripper 65 has had a V-shaped point to cooperate with the dog 62. When the totalizer 13 is stepped to sub-units position said tripper operated the dog to release the locking lever during the stepping motion, but that one step of the carriage was usually sufficient to carry the tripper beyond the dog so that the latter and the bell crank 60, 54 could be returned immediately to their normal position at the end of a single step of the carriage. This mode of operation has been rendered inadvisable by the addition of the lever 82 because at that instant the said lever is holding the locking lever 45 up and the latter would therefore probably be held up notwithstanding the momentary tripping of the latch 50. It will be understood that in this same step of the carriage from units to sub-units position the cross truck is itself freed and jumps back to the right but the bracket 30 would probably not get away from the incline 86 in time to let the locking lever fall. I have therefore changed the shape of the tripper 65, prolonging it somewhat to the right with a straight upper edge 90 so that when the carriage moves to sub-units position said tripper will not only swing the dog 62 and the bell crank 60, 54 but will hold them in their swung position as long as the carriage stands in sub-units position. The latch lever 50 will therefore be held in its tripped position while the cross truck is jumping rightward. Early in the rightward motion of said truck the bracket 30 will move out from under the incline 86 of the lever 82 and allow the latter to fall and the locking lever 45 to drop to its locking position.

Various changes may be made in the details of construction and arrangement without departing from my invention.

What I claim as new and desire to secure by Letters Patent, is:

1. The combination with cross footing mechanism including a jumping element and clearance proof mechanism, of means whereby said clearance proof mechanism is disabled by the jumping element occupying one position of its travel, and means for retaining said jumping element in such position.

2. The combination with a main carriage, cross footing mechanism including a jumping element, and clearance proof mechanism including an operating part and a latch normally holding said part in inoperative position and that is tripped at a predetermined point in the travel of the main carriage, of supplemental means controlled by said jumping element in one position of its travel for holding said part in its inoperative position independently of said latch.

3. In a combined typewriting and computing machine, the combination of a typewriter carriage, cross footing mechanism for computing numbers written in a plurality of column positions of said typewriter carriage and including a jumping element that travels through each column with said carriage and jumps back at the end of the column, means for preventing the jump back of said jumping element when the carriage is run continuously through a plurality of columns, means whereby the last mentioned means may be operated by hand and latched in operative position in order to disable said jumping element so that the machine can be used for other purposes than cross footing, clearance proof mechanism, and means whereby the disabling of said jumping element also disables said clearance proof mechanism.

4. In a combined typewriting and computing machine, the combination with a main carriage capable of traveling through a plurality of computing columns, cross footing mechanism including a jumping carriage which makes one reciprocation for each column, clearance proof mechanism for said cross footing mechanism including a locking lever and means for tripping said lever off at the end of a predetermined computing column, a device acting to hold said lever against falling to locking position when the cross footer carriage is in an extreme position, said tripping means acting through one entire step of the carriage so as to hold said lever released until the jumping carriage moves away from its extreme position.

5. In a combined typewriting and computing machine, the combination with a main carriage, cross footing mechanism including a jumping carriage, and clearance proof mechanism for said cross footing mechanism including a lock, of means for disabling said jumping carriage and means controlled by said disabling means for preventing operation of said lock.

6. In a combined typewriting and computing machine, the combination with a main carriage, cross footing mechanism including a jumping carriage, and clearance proof mechanism for said cross footing mechanism, of means set by hand to retain said jumping carriage at one extreme of its motion, and means for thereby disabling said clearance proof mechanism.

7. In a combined typewriting and computing machine, the combination with a main carriage; cross footing mechanism including a jumping carriage; clearance proof mechanism including a locking lever 45 and means 50 etc. whereby said locking lever is normally maintained in an inactive position but is tripped off on occasion; and means for retaining said jumping carriage at an extreme of its motion in order to put the cross footing mechanism out of use, of a supplemental holding device 82 acting when the carriage is so retained to hold said locking lever in its inactive position independently of said means 50 etc.

8. In a combined typewriting and computing machine, the combination with a typewriter carriage, computing mechanism including a jumping carriage, a latch for said jumping carriage, a swinging bar on said typewriter carriage for controlling said latch, and releasing means for said carriage operating to swing said bar, of a detent adapted to engage and hold said swinging bar only in case the latter is swung by hand beyond the position to which it is swung by said releasing device.

9. The combination with a carriage, a jumping truck and a flap on the carriage connected to control said truck, of a latch on said carriage, said latch having a shoulder for holding said flap in an abnormal position and having also a cam portion 42 engaged by a portion of said flap and acting to draw said shoulder into holding position.

Signed at the borough of Manhattan, city of New York, in the county of New York and State of New York this 17th day of February, A. D. 1926.

FREDERICK A. HART.